UNITED STATES PATENT OFFICE.

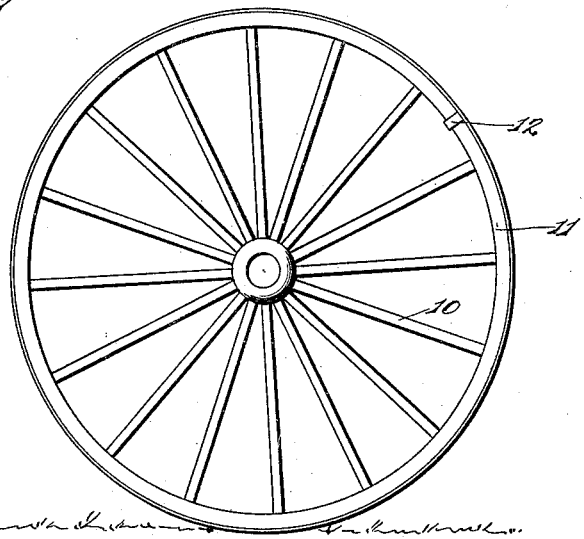
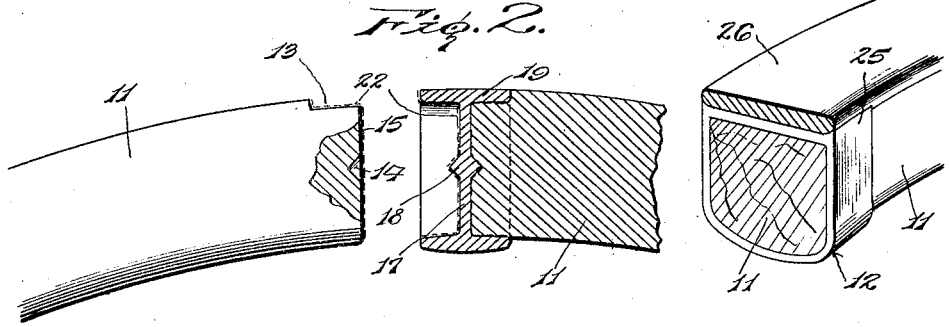
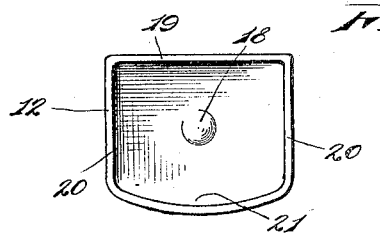

PHILLIP S. JENNINGS, OF ONEONTA, ALABAMA, ASIGNOR OF ONE-HALF TO LILIUS B. RAINEY, OF GADSDEN, ALABAMA.

RIM-JOINT CONNECTION FOR VEHICLE WHEELS.

1,410,187.   Specification of Letters Patent.   Patented Mar. 21, 1922.

Application filed September 19, 1921. Serial No. 501,588.

*To all whom it may concern:*

Be it known that I, PHILLIP S. JENNINGS, a citizen of the United States, residing at Oneonta, in the county of Blount and State of Alabama, have invented certain new and useful Improvements in Rim-Joint Connections for Vehicle Wheels, of which the following is a specification.

My invention refers to felloe joint connections for vehicle wheels and its main object is to provide a device of this class, which is easily applied at the joint of the felloe, and more secure than ordinary connections. It is moreover very compact and strong and the amount of material used is reduced to a minimum so that the device can be manufactured at very low cost.

In the accompanying drawing, one embodiment of the invention has been illustrated, and Figure 1 shows a side elevation of the vehicle wheel;

Figure 2 shows a portion of a wheel felloe partly in section and with the joint open;

Figure 3 is an end view of a connection; and

Figure 4 is a perspective view of a slight modification of the device.

The vehicle wheel 10 shown in Figure 1 has a wooden rim 11 with an end connection 12 shown at the joint of the felloe. As best seen in Figure 2, the felloe is provided with an offset or depression 13 across the felloe at the exterior periphery thereof and has a small central recess 14 in the two adjacent surfaces 15 of the ends of the felloe.

The connection or coupling member 12 is made in the form of a sleeve with a central partition 17 having two spike like projections 18 one on each side of the partition and intended to engage with the recesses 14 provided in the ends of the felloe. The exterior wall 19 of the sleeve is made to seat in the offsets 13 on the ends of the felloe in such a manner that the exterior surface of the wall comes flush with the exterior periphery of the felloe, when the parts are assembled. The other three walls of the sleeve 12 conform to the contour of the sides of the felloe. The sleeve is here shown with two perpendicular walls 20 fitting the two sides of the felloe and a curved wall 21 fitting the interior periphery of the felloe. It will be seen that only the exterior wall 19 is recessed into the felloe, but that the other three walls embrace the sides and the interior surface thereof.

In order to make the joint perfectly tight I prefer to supply an adhesive material between the adjacent surfaces such as red lead, or a suitable cement which has here been indicated by dotted lines 22, which material also serves as a preservative for the wood.

It will be noted that no bolts or rivets are required for the sleeve which holds the two ends rigidly together as soon as the tire is applied around the felloe.

In the modified form of the device illustrated in Figure 4 the exterior wall of the sleeve which, as before, fits the offset 13, is provided with two annular beads 25 which are intended to receive between them the metallic tire 26 which is shrunk around the tire. These beads will then prevent the tire from slipping sideways and will provide a good hold on the felloe. This sleeve is also provided with a central partition 17 and spikes 18.

It will be understood that the invention is applicable not only to ordinary carriage wheels, but also to automobile wheels and that the tire in that case is shaped to receive a rubber shoe of a pneumatic type.

Having thus described the invention what is claimed as new is:

1. A felloe joint connection for vehicle wheels, comprising a sleeve adapted to tightly grip around two ends of the felloe and means on its outer wall for engaging the tire.

2. A felloe joint connection for vehicle wheels, comprising a sleeve adapted to tightly grip around two ends of the felloe, a transverse partition in said sleeve forming an abutment for said ends, and spaced beads along the edges of the exterior wall of said sleeve.

3. A felloe joint connection for vehicle wheels, comprising a sleeve adapted to tightly grip around two ends of the felloe, a transverse partition in said sleeve forming an abutment for said ends, and a spike like projection on each side of said partition intended for penetrating into said ends, and spaced beads along the edges of the exterior wall of said sleeve.

4. A combination with a wheel felloe having an offset at its outer periphery across each end thereof; of a sleeve having its exterior wall fitting said offset and provided with beads engaging the tire, and its other walls embracing the other sides of said ends.

5. A combination with a wheel felloe having an offset at its outer periphery across each end thereof; of a sleeve having its exterior wall fitting said offset and provided with beads engaging the tire, and its other walls embracing the other plain sides of said ends, and a transverse partition in said sleeve forming an abutment for each of said ends.

6. A combination with a wheel felloe having an offset across each end thereof; of a sleeve having its exterior wall fitting said offset, and its other walls embracing the other sides of said ends, a transverse partition in said sleeve forming an abutment for each of said ends, a spike like projection on each side of said partition, said ends being provided with corresponding recesses for said projections, a pair of beads on the exterior wall of said sleeve adapted to engage the tire.

7. A combination with a wheel felloe having an offset across each end thereof; of a sleeve having its exterior wall fitting said offset, and its other walls embracing the other sides of said ends, a transverse partition in said sleeve forming an abutment for each of said ends, a spike like projection on each side of said partition, said ends being provided with corresponding recesses for said projections, a pair of beads on the exterior wall of said sleeve adapted to engage the tire, and an adhesive substance between the adjacent surfaces of said felloe and said sleeve.

In testimony whereof I affix my signature.

PHILLIP S. JENNINGS. [L. S.]